July 13, 1926.
N. SULZBERGER
PROJECTING APPARATUS, ETC
Filed August 13, 1921
1,592,393
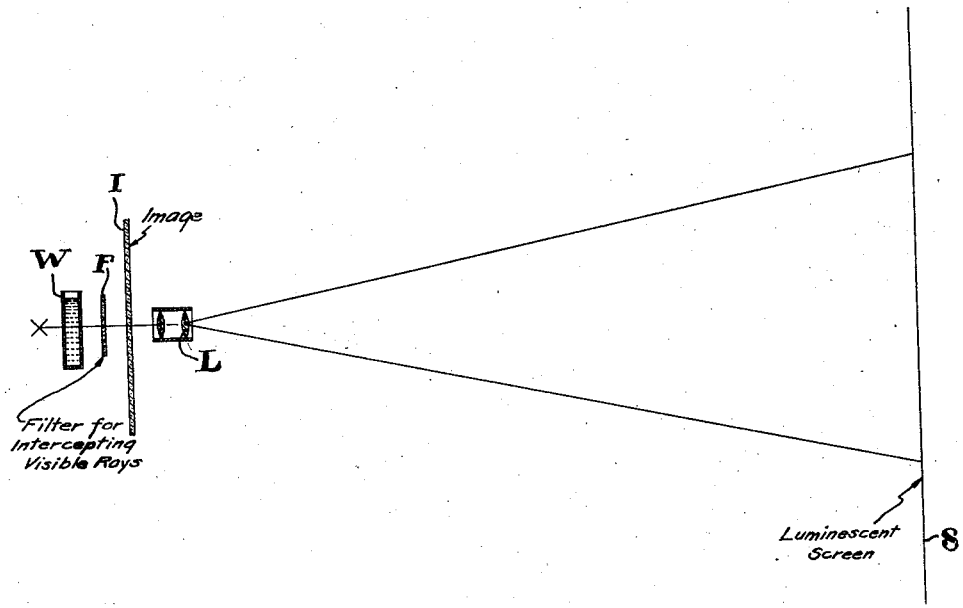

Patented July 13, 1926.

1,592,393

UNITED STATES PATENT OFFICE.

NATHAN SULZBERGER, OF NEW YORK, N. Y.

PROJECTING APPARATUS, ETC.

Application filed August 13, 1921. Serial No. 492,171.

This invention relates to improvements in methods and apparatus for projecting pictures, such as motion pictures, etc.

The films used in motion picture projecting apparatus are commonly made of material which is inflammable and combustible in character, particularly, when the films are overheated. In the usual projecting apparatus, the light used is intense in character and generates a great deal of heat, and the film, when projected, is subjected to the heating influence of such light.

According to the present invention I overcome the objections to the bringing of the film in proximity to the light used for projecting by cooling the light so that the film will be kept cool and so that the heating effect of the light will be sufficiently absorbed by the cooling agent.

The drawing shows one possible adaptation of the invention, but it is not to be understood to limit in any way the relative positions of the parts shown, or in any other manner. The drawing shows the projection of an image I upon a luminescent screen S by invisible rays from a source of visible and invisible rays represented at X, from which visible rays may be filtered as by the filter F.

A water jacket or cooling body of water may, for example, be used for the projecting apparatus, or parts of it, and so arranged that the film will be protected from objectionable heating; or as the drawing shows the water W may even pass between walls or lenses through which the light is projected, so that the film I will be protected from the heating effect of the light by means of the water jacket thus formed. When the projecting apparatus has its other parts water cooled, the heat of the light will not heat the surrounding atmosphere.

The protecting of the film in this way enables it to be projected more slowly, inasmuch as the exposure of the film for a longer period of time to the light will not cause objectionable heating.

The present invention is of more or less general application not only to the projection of moving pictures but also to the projection of single views, such as stereopticon views, particularly where the views are on films (but also on glass etc.) liable to be overheated by the ordinary projecting apparatus, also those for home use.

Ordinary motion pictures are projected by a visible light, so that the dark portions of the image appear dark on the screen and the transparent or translucent portions appear light. Instead of using visible light, however, for projecting the pictures on the screen, I may use invisible rays, such as ultra-violet rays, which are practically invisible under certain conditions, and in conjunction therewith, I may use a luminescent screen, that is, a screen containing a luminescent substance which will become luminescent when acted upon by such dark rays.

The invisible rays may be produced from a suitable source of light rich therein or from other sources of light by eliminating as far as possible the other rays. The heat producing rays are largely at the other end of the spectrum, and these rays can be, for the most part or entirely, eliminated by the use of suitable light filters which will absorb the other rays or prevent them from being projected to a greater or less degree. As shown in the drawing, a visible light may thus be used which would itself have a considerable heating effect, and the heating effect can be largely overcome or neutralized so far as its action on the film is concerned by water-cooling the light and by interposing a suitable light filter F which will permit the ultra-violet rays to pass without permitting any objectionable amount of heating rays to pass.

If a source of light is used which is practically free from visible rays, such a filter may be unnecessary, and the source of light can be used directly to give what may be considered a relatively cool or cold light with little, if any, objectionable heating effect on the film. Where, however, the light is a visible light and has a marked heating effect on the film, this can be overcome by interposing a suitable filter to prevent the visible rays of light and the heating rays from passing through to an objectionable extent, while still permitting the invisible rays to pass and the picture or image will in this case be projected on a luminescent screen S. The light filter can also be supplemented by a water jacket for still further reducing the heating effect of the light upon the film. In the case where visible light is used for projecting the picture, the film will similarly be protected from objectionable heating by the light, by means of the water jacket above described and indicated at W in the drawing.

It will accordingly be seen that the present invention involves the use of relatively cold light for projecting the pictures from the film, whereby the film is protected from objectionable heating by the light; and that the cold light may, in the case of an ultra-violet light, itself be a relatively cool light; or if a visible source of light is used the heating rays may be absorbed or cooled and the film thereby protected.

As an example of a suitable apparatus for projecting the pictures by means of invisible rays, I may use a water cooled quartz lamp, for example, a Kromayr lamp (a mercury lamp in quartz glass), together with a suitable filter or medium which will cut out practically all or a very large amount of the visible light rays. An ultra-violet screen such as a "Wood screen" can be used for this purpose; other screens, as Chance's "signal-green" glass in combination with suitable media, prisms, etc. may be used.

The projecting apparatus should, of course, have suitable lenses as indicated at L in the drawing and be provided with suitable focusing means to insure that the image will be properly projected upon the screen. Where the images are to be projected by invisible rays the lenses, etc. should of course be of material which will permit these rays to pass; while the portions of the image which are not to appear luminous should be of a material which prevents the invisible rays from passing therethrough. A silver image upon a film is thus suitable for projection by the invisible or ultra-violet rays.

The screen or surface S upon which the image I is to be projected may be treated in whole or in part with a luminescent preparation (where invisible rays are used for the projection of the image) and the screen may even be adapted for use with the ordinary luminous projector, in which case the light from the projecting apparatus will be supplemented by the luminescence of the luminescent substances.

Where the screen is a luminescent screen, various luminescent substances may be used, including fluorescent substances or mixtures, or phosphorescent substances or mixtures, or both fluorescent and phosphorescent substances. By fluorescent substances I mean those substances which remain luminous only so long as they are stimulated by the light rays; while by phosphorescent substances I mean those which continue to be luminous after the rays have been shut off. I use the term "luminescent" to include both fluorescent and phosphorescent or either one, as the case may be. Different fluorescent and phosphorescent substances may have different colors and may themselves undergo color changes or show a distinctive color when subjected to the action of ultra-violet light. Certain substances of a fluorescent character can thus be used. For example, resorcin blue, rhodamin for red etc. The fluorescent substances may be used either alone or in admixture with each other to give light effects of different kinds. Fluorescent substances can also be used with phosphorescent substances, or phosphorescent substances may be used alone, so that the image will persist for a longer or shorter time after the invisible rays have been cut off from the screen. By regulating the nature and amount of the luminescent and phosphorescent substances and the intensity of the invisible rays, the duration of the image may be regulated so that it will persist for a longer or shorter period of time, for example, when projecting moving pictures to permit the next image to be formed so that the successive images will more or less blend into each other in cases reducing or eliminating flicker. Among the phosphorescent substances that may be used may be mentioned phosphorescent zinc sulphide or Sidots blende, Balmain's paint, alkaline earth sulphides such as calcium sulphide or barium sulphide produced by suitable calcination, etc. The fluorescent or phosphorescent substances may also be used in conjunction with substances such as radium or radio-active materials, which will increase their phosphorescent or fluorescent qualities or prolong or increase the luminescent effect. The luminescent substances may be secured to the surface of the screen to be luminated in any suitable manner, for example, by the use of a transparent varnish.

It will thus be seen that the projecting apparatus of the present invention may, particularly where visible light is used, be similar to the usual projecting apparatus in that it involves the use of a suitable source of light together with focusing lenses L, etc; but that the apparatus differs from the usual projecting apparatus by the provision of cooling means W so that the film I is not exposed to objectionable heating effect from the light source used. With the use of visible light for projecting visible pictures in the usual way, the projecting apparatus will be cooled to prevent the objectionable heating action of the light on the film. With the use of invisible rays for projecting the image upon a luminescent screen, a similar cooling effect may be used or the light itself may be one which is relatively free from heating rays, i. e., a source of relatively cold light which may not require separate cooling means. In certain cases air or attachment to a refrigeration system may act as the cooling means.

The present invention may be used in conjunction with the taking of pictures or images photographically inasmuch as the projected pictures may, in some cases, be photographed. Even when invisible light is used, this light will nevertheless be active upon photographic plates or films so that pictures may be taken of objects by means of invisible light, such as by means of invisible light projected by an apparatus such as that above described.

In certain cases, where direct cooling of the projection lamp or source of light is desired, the same may be enclosed in quartz or some other suitable transparent medium which will allow direct cooling without great fear of breakage. Also quartz lenses may be used in the apparatus, which are indicated particularly when employing ultra-violet rays. Filtration of the water (or other liquid) and freeing from disturbing air-bubbles may be employed, which may be of particular advantage when using the ordinary refrigerating system as the cooling means. The disturbing effect of ozone is also overcome, when using an ultra-violet projection apparatus properly cooled.

I claim:

1. A projecting apparatus comprising means for projecting invisible rays substantially freed from visible rays, a luminescent screen adapted to be excited by invisible rays, and means arranged between the projecting means and the screen for holding an image to be projected on said screen by intercepting some of the invisible rays, whereby the visible portions of the image are reproduced on the screen by excitation of luminous material by substantially invisible light.

2. A projecting apparatus comprising a source of light containing both visible and invisible rays, means for substantially removing the visible rays therefrom, a luminescent screen adapted to be excited by the invisible rays, and means for supporting an image or images between the source of light and the screen for intercepting some of the invisible rays, whereby the visible portions of the image are reproduced on the screen by excitation of luminous material by substantially invisible light.

3. A projecting apparatus comprising a source of light, means for substantially absorbing the visible rays, means for cooling the transmitted invisible rays, a luminescent screen adapted to be excited by the invisible rays, and means arranged between the source of light and the screen for supporting an image which intercepts some of the invisible rays, whereby the visible portions of the image are reproduced on the screen by excitation of luminous material by substantially invisible light.

4. The method of projecting images and the like, which comprises removing from a luminous source substantial amounts of the visible rays, cooling the transmitted rays, projecting the transmitted rays intercepting some of the transmitted rays by an image and thereafter exciting a luminescent screen with the remaining transmitted rays.

5. The method of projecting images and the like which comprises projecting invisible rays, intercepting some of the rays with an image, passing the remaining rays for exciting a luminescent screen, and photographing the presented image.

6. The method of projecting images and the like which comprises projecting invisible rays substantially freed from visible rays upon a luminescent screen after intercepting some of the invisible rays with an image.

7. The method of projecting images and the like which comprises removing from a luminous source substantially all of the visible rays, projecting the remaining invisible rays, intercepting some of the invisible rays with an image and thereafter exciting a luminescent screen with the remaining rays.

In testimony whereof I affix my signature.

NATHAN SULZBERGER.